United States Patent [19]

Togashi et al.

[11] Patent Number: 5,105,865

[45] Date of Patent: Apr. 21, 1992

[54] BIAS TIRE FOR AIRCRAFT

[75] Inventors: Minoru Togashi, Tokyo; Takeshi Takanami, Kodaira; Masahiro Kuroda, Higashimurayama, all of Japan

[73] Assignee: Bridgestone Corporation, Tokyo, Japan

[21] Appl. No.: 452,435

[22] Filed: Dec. 19, 1989

[30] Foreign Application Priority Data

Mar. 9, 1989 [JP] Japan ..................................... 1-56800

[51] Int. Cl.$^5$ ......................... B60C 3/00; B60C 15/05
[52] U.S. Cl. ................... 152/454; 152/454; 152/559
[58] Field of Search ................ 152/454, 548, 559, 545

[56] References Cited

U.S. PATENT DOCUMENTS

| | | | |
|---|---|---|---|
| 4,349,062 | 9/1982 | Tsurunaga et al. | 152/559 X |
| 4,481,994 | 11/1984 | Pommier | 152/556 X |
| 4,513,802 | 4/1985 | Togashi et al. | |
| 4,867,218 | 9/1989 | Asano et al. | 152/454 |

FOREIGN PATENT DOCUMENTS

| | | |
|---|---|---|
| 2132861 | 1/1972 | Fed. Rep. of Germany . |
| 2437945 | 4/1980 | France . |
| 2024738 | 1/1980 | United Kingdom . |
| 2044693 | 10/1980 | United Kingdom . |

Primary Examiner—Geoffrey L. Knable
Attorney, Agent, or Firm—Sughrue, Mion, Zinn, Macpeak & Seas

[57] ABSTRACT

A bias tire for an aircraft includes a laminate formed by laminating a plurality of plies intersecting with each other and reinforced by organic fiber cords having a large thermal contraction coefficient. Both ends of the plies are turned up around bead cores. A profile curve I of a representative ply corresponding to that number counted from an innermost ply of the laminate plus one, which is one half of a total number of the plies when the tire mounted on a normal rim is filled with 1% of a normal inner pressure is constructed by a smoothly changing crown profile curve J and a smoothly changing side profile curves K. The crown profile curve J intersects a natural equilibrium profile curve H and is positioned between natural equilibrium profile curves E and H between both shoulder ends. The side profile curves K contact both the natural equilibrium profile curves E and H at rim points and smoothly connecting with the crown profile curve J and are positioned outwardly of the natural equilibrium profile curves E and H between the shoulder ends and rim points.

5 Claims, 9 Drawing Sheets

FIG_6

FIG_8

BIAS TIRE FOR AIRCRAFT

BACKGROUND OF THE INVENTION

This invention relates to a bias tire for an aircraft having a laminate formed by laminating a plurality of plies reinforced by organic fiber cords having a large thermal contraction coefficient to intersect with each other and bead cores around which both ends of part of the plies are turned up.

Bias tires for aircraft sometimes undergo running on the ground over long distances, running on the ground or running for taking-off and landing under double loaded conditions (in case of twin wheels, one of which has failed and the other is subjected to twice load) in an emergency. In such running, cords in plies constituting the tire particularly in the proximity of beads are frequently mechanically fatigued and deteriorated due to heat. An accumulation of such bad conditions results in breaking down of the cords and finally damage to the tire.

In order to prevent such a failure, it has been proposed to increase the number of plies of sidewalls of a tire, particularly at bead portions to improve rigidity of the tire to decrease deformation upon being loaded, thereby reducing mechanical strains produced in the cords near to the bead portions. It has also proposed to increases the rubber thickness between adjacent plies so that deformation of the tire is absorbed by shearing deformations of the thick rubber, thereby reducing mechanical strains produced in the cords near the bead portions.

However, these tires as proposed have a disadvantage of considerably increased weight although durability of the bead portions is improved to a certain extent.

SUMMARY OF THE INVENTION

In order to solve this problem, the inventors of the invention have investigated a mechanism of occurrence of strains in the proximity of bead portions of tires running under loaded conditions to find the following recognition. Large bending deformations in directions perpendicular to ply surfaces occur in the proximity of bead portions directly below the load due to collapse of sidewalls. Large bending deformations (shearing deformations) occur in the ply surfaces in the proximity of bead portions corresponding to treading portions or kicking off portions due to tire outer surfaces becoming flat by being urged against a load surface. Because of these large deformations, large tensile strains or compressive strains are produced in cords near the bead portions. In this case, the bending deformations perpendicular to the ply surfaces do not affect lengths of plies themselves (in meridian directions), while the bending deformations in the ply surfaces cause the lengths of plies themselves to change (in circumferential directions). Therefore, what contributes to occurrence of strains in cords are the bending deformations in the ply surfaces.

It is therefore an object of the invention to provide an improved bias tire for an aircraft, whose durability is improved without increasing the weight of the tire with the aid of the above recognition.

In order to achieve this object, according to the invention a profile curve I of a representative ply corresponding to that number counted from an innermost ply of the laminate plus one, which is one half of a total number of the plies when the tire mounted on a normal rim is filled with 1% of a normal inner pressure comprises a smoothly changing crown profile curve J and a smoothly changing side profile curves K, said crown profile curve J intersecting a natural equilibrium profile curve H at shoulder ends and being positioned between natural equilibrium profile curves E and H between both the shoulder ends, and said side profile curves K contacting both the natural equilibrium profile curves E and H at rim points and smoothly connecting with the crown profile curve J and being positioned outwardly of the natural equilibrium profile curves E and H between said shoulder ends and the rim points, where said natural equilibrium profile curve E is determined by a diameter D (mm) of the representative ply, a cord angle A (degree) of the representative ply at an equatorial plane of the tire, a diameter B (mm) of the representative ply at the rim point and a width C (mm) of the representative ply at the rim point when filled with 1% of the normal inner pressure, and said natural equilibrium profile curve H is determined by the cord angle A, the diameter B and the width C and a diameter G (mm) having a relation of $D+3(D-B)/100 \leq G \leq D+10(D-B)/100$.

The crown profile curve J of the representative ply when filled with 1% of the normal inner pressure is a smoothly changing curve intersecting the natural equilibrium profile curve H and positioned between natural equilibrium profile curves E and H as above described. As a result the radii of the crown profile curve J become larger than those of the natural equilibrium profile curve E at the crown portion.

On the other hand, the side profile curves K are a smoothly changing curves contacting both the natural equilibrium profile curves E and H at the rim points and smoothly connecting the crown profile curve J between the shoulder ends and the rim points and further are positioned outwardly of both the natural equilibrium profile curves E and H. Moreover, the crown profile curve J continuous with the side profile curves K has the large radii of curvature as above described. Therefore, radii of the curvature of the side profile curve become smaller than those of the natural equilibrium profile curve E also in radially outward areas from the maximum width positions and in the proximities of the bead portions. Because such a tendency is maintained even when filled with the normal inner pressure, the radii of curvature in the proximities of the bead portions become small. As a result, the radii of the plies in the proximities of the bead portions are also small.

When the plies corresponding to an area contacting with the ground deform owing to running of the tire, bending deformations in directions perpendicular to the ply surfaces somewhat increase because the radii of curvature in the proximities of the bead portions is small as above described. On the other hand, part of the bending deformation in the ply surfaces is converted into twisting deformations because the radii of curvature is small. As a result, ultimate strains resulting from the bending deformations in the ply surfaces decrease. Moreover as the length of the plies is scarcely changed by the twisting deformations, no large strains occur in the cords, with the result that strains of the cords in the proximities of the bead portions are mitigated so that the durability of the bead portions is improved. Moreover, according to the invention all that is required is to specify the configuration of the plies so that the economical prominence of aircraft is improved without increasing the weight of the aircraft.

On the other hand, because the radii of curvature of plies in the sidewalls in the proximities of shoulder ends are also small for the reason similar to that as above described, part of the bending deformations in the ply surfaces is readily converted into torsional deformations to reduce the bending deformations in the ply surfaces. As a result, the durability of the plies in the proximity of the shoulder ends is improved to prevent the difficulty that the plies in the proximities of the shoulders in the proximities of the shoulder ends would be prematurely damaged due to fatigue without exhibiting the effects of the improved durability of the bead portions irrespective of their improvement. Moreover, because of the large radii of curvature of the crown profile curve J as above described, the high speed durability is improved and the tensile forces of the cords reinforcing the plies become suitable values to improve the enveloping property for foreign substances, thereby improving the anti-cutting property.

With this arrangement, when the tire mounted on the normal rim is filled with from 1% to 100% of the normal inner pressure, the enlargement ratio S (%) of tire overall diameter at the tire equatorial plane is less than the value calculated by the equation $S = 17.73 - 13.85 \times R$. Moreover, the displacement T (mm) at the point L is less than the value calculated by the equation $T = \frac{1}{2} \times Q \times S \times N \div P$, and progressively increases as approaching on the tire outer surface from the leaving point M to the tire equatorial plane.

In this invention, moreover, the profile of the tire outer surface which contacts the rim flange is preferably coincident with the inner profile of the rim flange when the tire mounted on the normal rim is filled with the normal inner pressure. In this manner, the falling down deformation of the bead portions when filled with the normal inner pressure is restrained so that the profile curve I of the representative ply can be maintained substantially at constant irrespective of change in inner pressure. The effect as above described can be exhibited also when filled with the normal inner pressure.

In the invention, moreover, it is preferable that the total number of the plies is more than twelve and three sets of bead cores on one side are provided and that the representative ply is turn up around middle bead cores among the three sets of bead cores. With this arrangement, the rigidity of the laminate will become high so that the deformation of the tire when filled with the normal inner pressure is restrained, with the result that the profile curve I of the representative ply can be maintained substantially at constant irrespective of change in inner pressure.

In the invention, furthermore, the distance between the bead heels in vulcanizing the tire is preferably 85%-97% of the distance between the bead heels when the tire mounted on the normal rim is filled with 1% of the normal inner pressure. Such an arrangement eases the building of the tire.

In order that the invention may be more clearly understood, preferred embodiments will be described, by way of example, with reference to the accompanying drawings.

DETAILED EXPLANATION OF THE PREFERRED EMBODIMENTS

Figure 1:
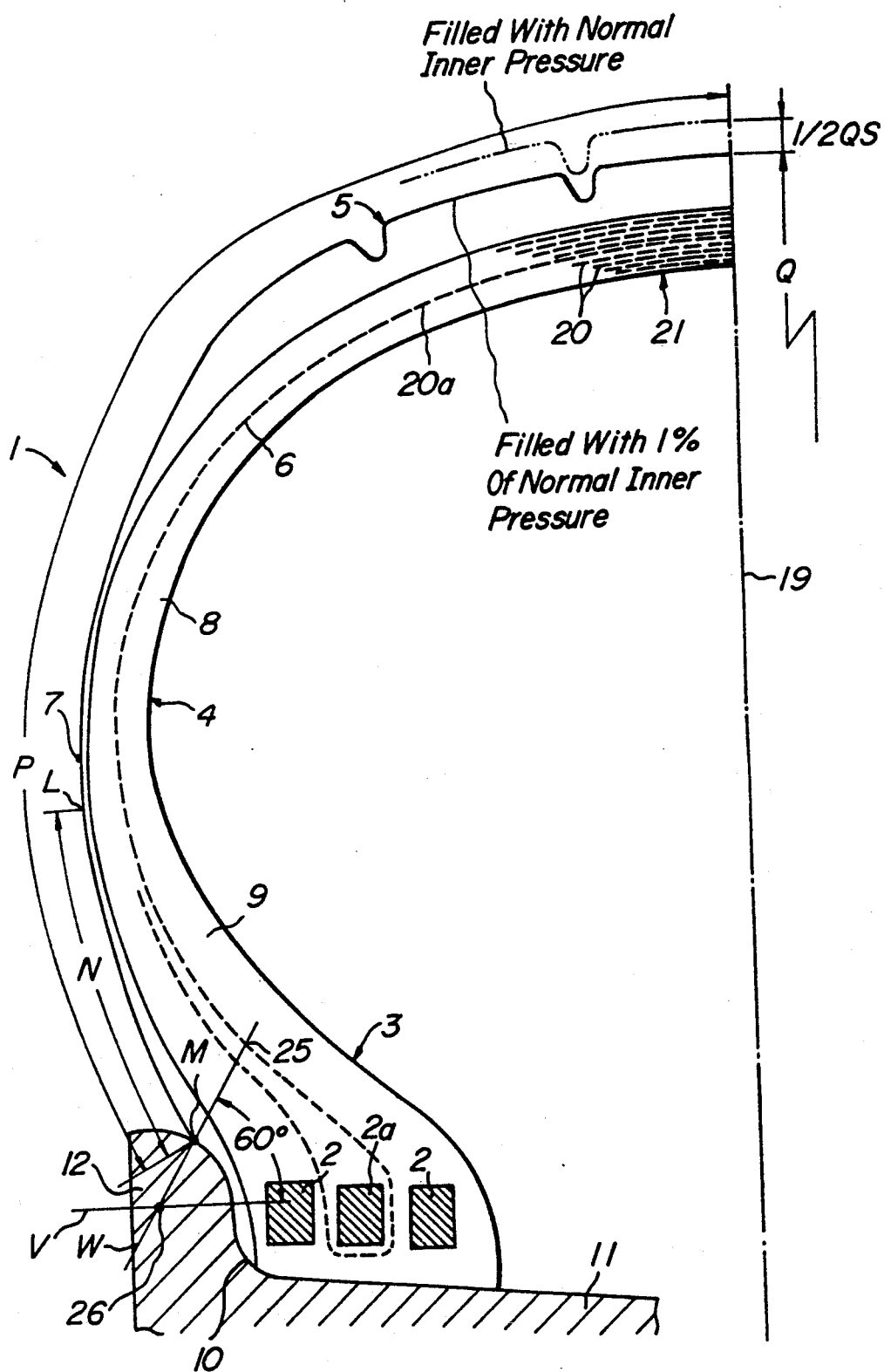
FIG. 1 is a sectional view in the meridian plane of a tire of one embodiment of the invention.

FIG. 1 illustrates a bias tire 1 for an aircraft according to the invention which includes bead portions 3 (only on shown in the drawing illustrating a half of the tire) each having plural sets (three sets in this embodiment) of bead cores 2 embedded therein, sidewalls 4 extending from the bead portions 3 radially outwardly, and a crown portion 5 extending between the sidewalls 4. A joined position between the crown portion 5 and the sidewalls 4 are shoulder ends 6.

The bead portion 3 and the sidewall 4 of the tire is radially divided by a maximum width position 7 into two parts or an upper side portion 8 and a lower side portion 9 in FIG. 1 illustrating a half of the tire. The upper side portion 8 is in the proximity of the shoulder end 6 or between the maximum width position 7 and the shoulder end 6, while the lower side portion 9 is in the proximity of the bead portion 3 or between the maximum width position 7 and a bead heel 10 of the bead portion 3.

Figure 2:
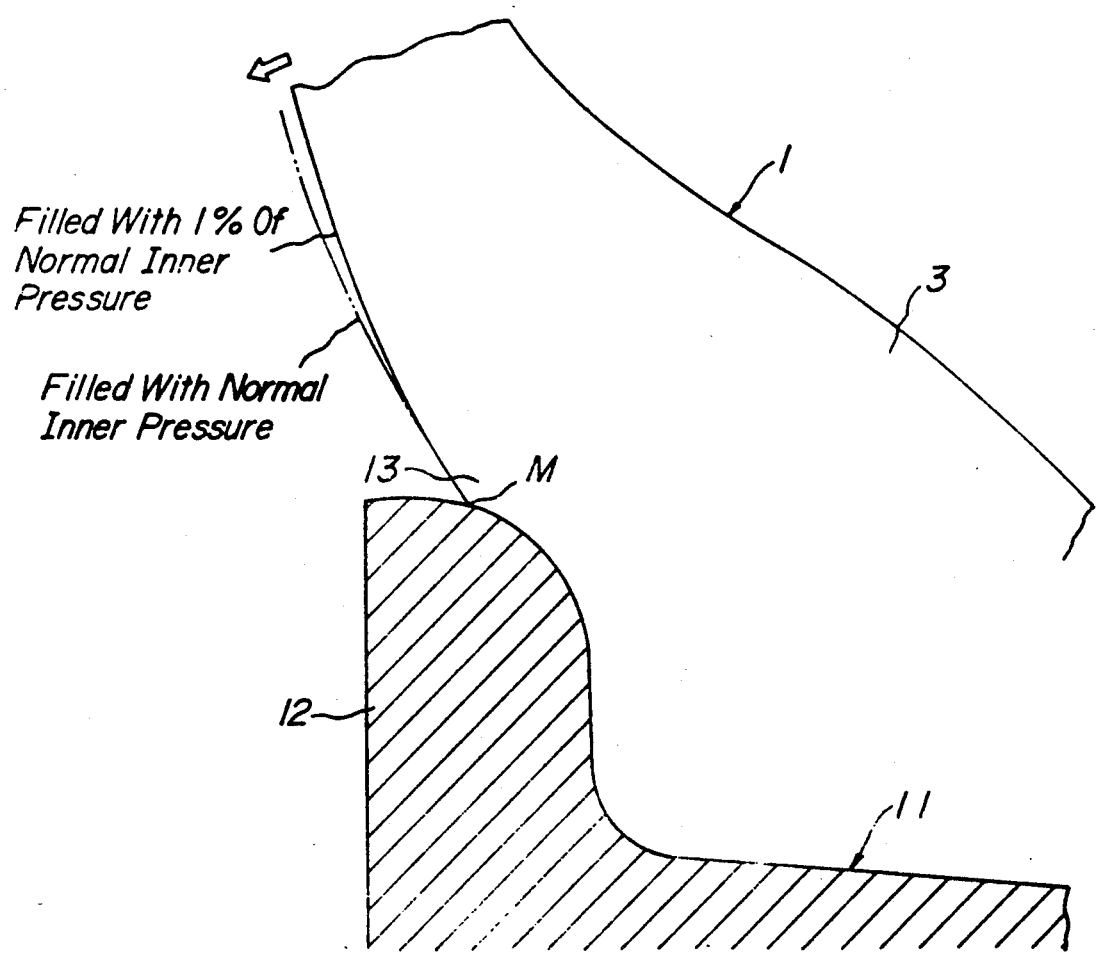
FIG. 2 is a sectional view in the meridian plane of the proximity of bead portions of the tire shown in FIG. 1.

The tire 1 is to be mounted on a normal rim 11 having at width edges rim flanges 12 to be in contact with bead portions of the tire. In this embodiment, as shown in FIG. 2 each bead portion 3 is formed on its outer surface with protrusion 13 extending in circumferential directions and having a substantial triangular section. The protrusion 13 has a Poisson's ratio is 0.5. In other words, the protrusion 13 is made of a rubber which does not change its volume when deformed.

As a result, when the tire 1 mounted on the normal rim 11 is filled with normal inner pressure, an inner profile of the rim flange 12 and an outer profile of a portion of the tire to be in contact with the rim flange 12 are coincident with each other. Therefore, both profiles are in surface contact with each other when the tire is filled with the normal inner pressure.

So long as a tire is constructed that inner surfaces of the rim flanges 12 and outer surfaces of bead portions 3 are brought into surface contact with each other when the tire is filled to the normal inner pressure, leaving points M on the outer surfaces of the tire 1 are scarcely changed even if the inner pressure is raised from 1% to 100% of the normal inner pressure. The leaving point M is a point on the tire separating from the rim 11. Therefore, a falling down deformation of the bead portions 3 can be prevented in this manner and the profile of the tire 1 or a profile curve I of a representative ply later described can be maintained substantially constant irrespective of change in inner pressure.

The expression "when filled with 1% of normal inner pressure" used herein is intended to mean a condition that after the tire 1 is completely fitted on a normal rim 11, the tire 1 is filled with 1% of the normal inner pressure.

Figure 3:
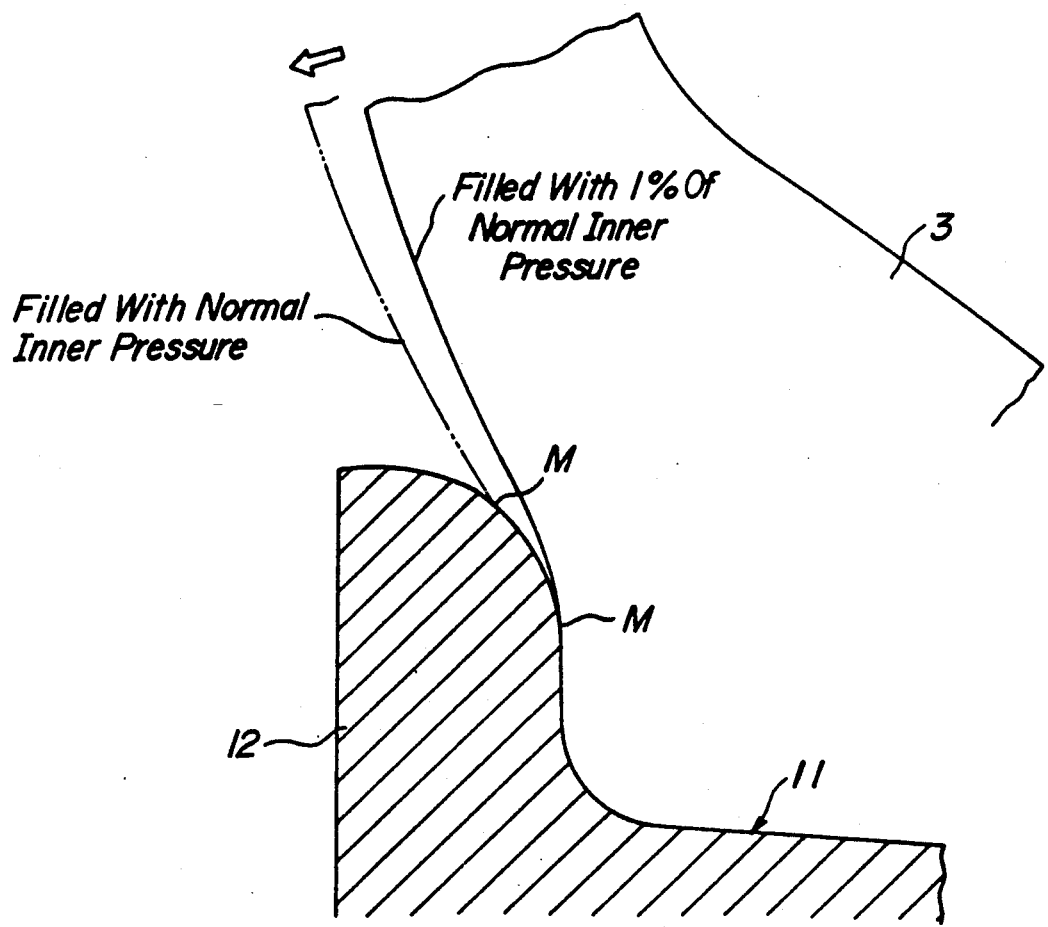
FIG. 3 is a sectional view in the meridian plane of the proximity of bead portions of another tire of comparative examples used in the experiment.

On the other hand, in case that a tire does not have protrusions 13 as shown in FIG. 3, an inner profile of the rim flange and an outer profile of the bead portion are different from each other. Therefore, when the inner pressure is raised from 1% to 100% of the normal inner pressure, the leaving point M on the outer surface of the tire is moved radially to a fairly long distance so that the bead portion falls down greatly.

Referring again to FIG. 1, the tire 1 has a laminate 21 constructed by laminating a plurality of plies 20 therein (sixteen plies on an equatorial plane 19 of the tire in this embodiment). Each of the plies is reinforced by for example organic fiber cords having a large thermal contraction coefficient for example nylon cords. These plies are laminated so that cords of adjacent plies intersect with each other.

Both ends of some of the plies 20 (all of the plies in this embodiment) are turned up about the bead cores 2.

In this invention, moreover, at least one layer of the plies 20 may be a breaker layer. In the embodiment, the plies 20 do not include a tread reinforcing fabric which scarcely support tensile forces. In this case, the ply corresponding to one plus the number of one half of the total number counted from the innermost ply is referred to herein "representative ply" which is the ninth ply 20a from the innermost ply in this embodiment. The representative ply 20a is turned up about the bead core 2a positioned in the middle of the three sets of the bead cores 2 in one half of the tire.

When that total number of the plies on an equatorial plane 19 of a tire is more than 12 and there are three sets of bead core 2 on one side as above described and the representative ply 20a is turned up around the middle bead core 2a, a rigidity of a laminate 21 becomes high so that when being filled with inner pressure, the deformation of the tire 1 is restrained. In other words, a profile of the representative ply 20a can be maintained substantially constant irrespective of change in inner pressure.

Figure 4:
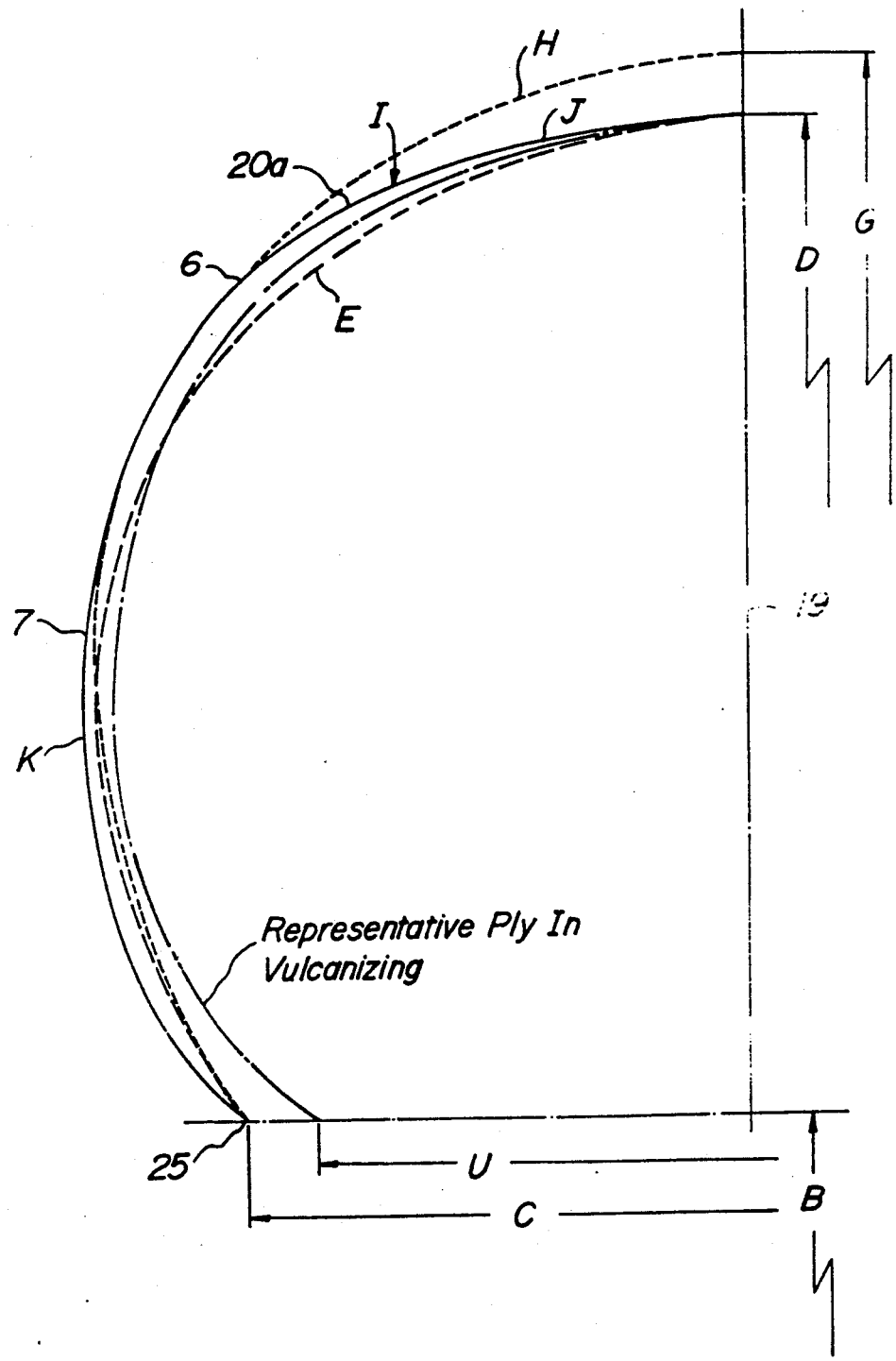
FIG. 4 is a sectional view in the meridian plane of a tire illustrating a representative ply when filled with 1% of the normal inner pressure according to the invention.

Because the profile of the tire 1 is determined by the profile of the representative ply 20a, the profile of the representative ply 20a (profile curve I) is identified as follows. As shown in FIG. 4, the profile curve I of the representative ply 20a of the tire 1 mounted on the normal rim 11 and filled with 1% of the normal inner pressure is constructed by a crown profile curve J and a side profile curve K continuous with the curve J in one half of the tire.

The crown profile curve J used herein is a smoothly changing curve which intersects a natural equilibrium profile curve H later described at both the shoulder ends 6 or at a crown portion 5 between natural equilibrium profile curves H and E later described In this embodiment, the crown configuration curve J contacts the natural equilibrium profile curve E on the equatorial plane 19.

The natural equilibrium profile curve E used herein is a curve determined by a diameter D (mm) of the representative ply 20a, a cord angle A (degree) of the representative ply 20a at the equatorial plane, a diameter B of the representative ply 20a at the rim point, and a width C (mm) of the representative ply 20a at the rim point, when the tire mounted on the normal rim 11 is filled with 1% of the normal inner pressure.

On the other hand, the natural equilibrium profile curve H is a curve determined by the above described cord angle A, the diameter B, the width C and a diameter G (mm) larger than the diameter D and positioned in a following range.

$$D+3(D-B)/100 \leq G \leq D+10(D-B)/100$$

In this manner, the crown profile curve J intersects with the natural equilibrium profile curve H at both the shoulder ends 6 and is positioned between the natural equilibrium profile curves E and H between both the shoulder ends 6. As a result, a radius of curvature of the crown profile curve J is larger than the radius of curvature of the natural equilibrium profile curve E when the tire is filled with 1% of the normal inner pressure.

The rim point 25 is a point of intersection of the representative ply 20a with a straight line W which passes through a center 26 of curvature of an inner surface of the rim flange 12 and is inclined at 60° with a straight line V in parallel with a rotating axis of the tire 1 as shown in FIG. 1.

On the other hand, the side profile curve K is a smoothly changing curve which contacts both the natural equilibrium profile curves E and H at the rim point 25 and is positioned on an outer side of both the natural equilibrium profile curves E and H between the shoulder end 6 and the rim point 25 in the half of the tire.

As a result, a radius of curvature of the side profile curve K is smaller than the radius of curvature of the natural equilibrium configuration curve E at the upper side portion 8 in the proximity of the shoulder end 6 and the lower side portion 9 in the proximity of the bead portion 3 upon being filled with 1% of the normal inner pressure, in conjunction with smooth connection of the side profile curve K with the crown profile curve J having the large radius of curvature. Such a tendency of the curve K is maintained when the tire is filled with the normal inner pressure. Accordingly, radii of curvature of the upper and lower side portions 8 and 9 when filled with the normal inner pressure are also small.

In order to obtain the above profile curve I of the representative ply 20a when filled with 1% of the normal inner pressure, all that is required is to bring the distance between the bead heels 10 when vulcanizing the tire 1 within 85–97% of the distance between bead heels 10 when the tire mounted on the normal rim 11 is filled with 1% of the normal inner pressure. Such a tire having the required profile curve of the representative ply 20a is easily manufactured in this manner.

When such a tire 1 mounted on the normal rim is filled with 1% of the normal inner pressure and further filled with the inner pressure to the normal inner pressure, an outer diameter of the tire on the equatorial plane 19 will be enlarged. An enlargement ratio S (%) of the outer diameter on the equatorial plane 19 of the tire filled conditions between 1% and 100% of the inner pressure is less than a value obtained by the formula.

$$17.73 - 13.85 \times R$$

If an enlargement ratio S of an outer diameter of a tire is more than a value obtained by the above equation, tensile forces acting upon plies 20 positioned in a crown portion 5 upon being filled with the inner pressure become too large, as a result of which an enveloping property of the tire for foreign objects on a road surface is detrimentally affected to lower an anti-cutting property disadvantageously.

The term "R" used therein is an Aspect ratio of a tire when filled with the normal inner pressure, and in more detail is a value obtained by dividing a height in section by a width in section of the tire upon being filled with the normal inner pressure.

When the tire 1 mounted on the normal rim has been filled with 1% of the normal inner pressure, the tire is filled with the normal inner pressure the outer surface of the tire in any points from the leaving point M to the equatorial land 19 is displaced outwardly. A displacement T (mm) of any point L of the outer surface of the tire in a section along a meridian plane from 1% to 100% of the normal inner pressure is less than a value obtained by the following formula.

$$\frac{1}{3} \times Q \times S \times N \div P$$

Moreover, the displacement T progressively increases as the points approach on the outer surface of the tire from the leaving point M to the equatorial plane 19.

The term "N" (mm) used herein is a distance along the surface of the tire from the leaving point M to the above point L upon being filled with 1% of the normal inner pressure. The term "P" (mm) used herein is a distance along the surface of the tire from the leaving point M to an intersecting line between the outer surface of the tire and the equatorial plane 19. Moreover, the "Q" term (mm) is an outer diameter of the tire when filled with 1% of the normal inner pressure.

When an aircraft equipped with these tires runs on runways long distances or runs or takes-off or lands under a double load, the plies 20 in opposition to the earth contacting area of the tire are greatly deformed, as a result of which bending deformations in directions perpendicular to ply surfaces and bending deformations in the ply surfaces (shearing deformations) will occur in these plies 20.

In this case, the bending deformations in the ply surfaces greatly contribute to the occurrence of strains of the cords of the plies 20 as above described. In this embodiment, because the radius of curvature of the representative ply 20a at the lower side portion 9 in the proximity of the bead portion 3 is small as above described, part of the bending deformations in the ply surfaces is readily converted into torsional deformations to reduce the bending deformations in the ply surfaces.

At this moment, torsional deformations newly occur in the plies 20 of the lower side portion 9, while the bending deformations in the directions substantially perpendicular to the ply surfaces somewhat increase. However, the torsional deformations and the bending deformations in the directions perpendicular to the ply surfaces do not largely affect the strains of the cords, so that after all the strains of the cords of the lower side portion 9 are reduced with resulting improved durability of the bead portion 3.

In this embodiment, moreover, because the above effect can be accomplished only by specifying the profile of the representative ply 20, the economical prominence of aircraft is improved without increasing its weight. On the other hand, because the radii of curvature of the plies 20 located at the upper side portion in the proximity of the shoulder end 6 is also small for the reason similar to that above described, part of the bending deformations in the ply surfaces is readily converted into torsional deformations to reduce the bending deformations in the ply surfaces.

As a result, the durability of the plies 20 at the upper side portion 8 is also improved. Therefore, it is possible to eliminate the fact that the plies 20 of the upper side portion 8 is prematurely fatigued and damaged so that the bead portion 3 does not exhibit the effect of the improved durability although the durability of the bead portion 3 has been improved as above described. Moreover, because the crown profile curve J has a large radii of curvature as above described, the durability of the tire at high speeds is improved and tensile forces of the cords reinforcing the plies 20 become suitable values to improve the enveloping property for foreign substances with resulting improved anti-cutting property.

Results of an experiment will be explained hereinafter. In this experiment, tires of Comparative Examples 1 and 2 and Examples 1 and 2 were prepared which were different in profile of representative plies of tires mounted on normal rims upon being filled with 1% of the normal inner pressure and different in contacting condition between rim flanges and bead portions.

Figure 5:
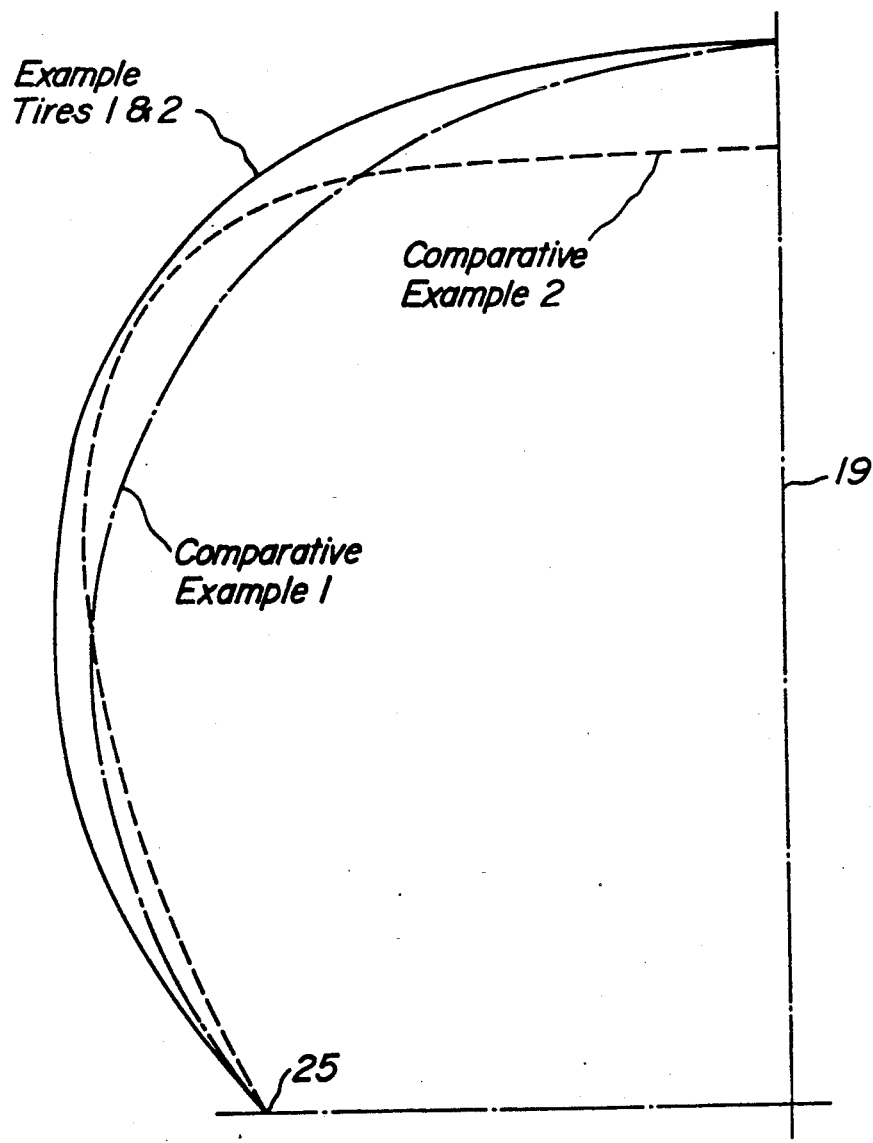
FIG. 5 is a sectional view illustrating a representative ply of the tires used in the experiment.

The tires of Comparative Example 1 included representative plies having natural equilibrium profiles as shown in FIG. 5 and bead portions in contact with rim flanges as shown in FIG. 3.

The tires of Comparative Example 2 included representative plies inwardly collapsed at crown portions to make smaller outer diameters at the crown portions than outer diameters of the natural equilibrium profiles as shown in FIG. 5 as in conventional tires. When the outer diameters at a crown portion become smaller, radii of curvature of representative ply at the crown portion become larger than radii of curvature of the natural equilibrium profile. On the other hand, being affected by the fact, radii of curvature of the representative ply in the proximity of a shoulder become smaller than those of the natural equilibrium profile, while radii of curvature of the representative ply in the proximity of a bead portion become larger than those of the natural equilibrium configuration. The contacting condition between the rim flanges and bead portions of the tires of Comparative Example 2 was as shown in FIG. 3.

With the tires of Example 1, representative plies were as shown in the above embodiment, while bead portions were in contact with rim flanges as shown in FIG. 3. With the tires of Example 2, representative plies were as shown in the above embodiment similar to those of Example 1, but bead portions were in contact with rim flanges as shown in FIG. 2.

These tires prepared for the experiment were all bias tires for aircraft, having sizes 49×17 30PR, Aspect ratios R of 0.84 and laminates including sixteen laminated plies of rubber coated nylon (6.6 of 1260 d/2) cords. Each of these tires included three sets of bead cores each made of rubber coated steel cord bundles of fifteen stages and nine rows and a ninth representative ply counted from the innermost of the laminate was turned up around middle bead cores among three sets of bead cores. Other dimensions of these tires were substantially the same.

In this case, the tires of Comparative Examples 1 and 2 were produced by the use of vulcanizing molds whose bladder ring widths were equal (336.6 mm) to rim widths of the normal rims. On the other hand, the tires of Examples 1 and 2 were produced by the use of vulcanizing molds whose bladder ring widths were narrower (303.0 mm) than rim widths of the normal rims.

These tires were mounted on normal rims having rim sizes of 49×17 and rim widths of 336.6 mm and filled with inner pressure from 1% (0.14 kg/cm$^2$) to 100% (13.7 kg/cm$^2$) of the normal inner pressure during which enlargement of outer diameters on tire equatorial planes were measured from which enlargement ratios were calculated. Results are shown in Table 1. With the tires of Examples 1 and 2 and Comparative Example 1, the enlargement ratios are less than 17.73−13.85×0.84=6.096(%). However, only the enlargement ratio of the tires of Comparative Example 2 is more than such a value.

Figure 6:
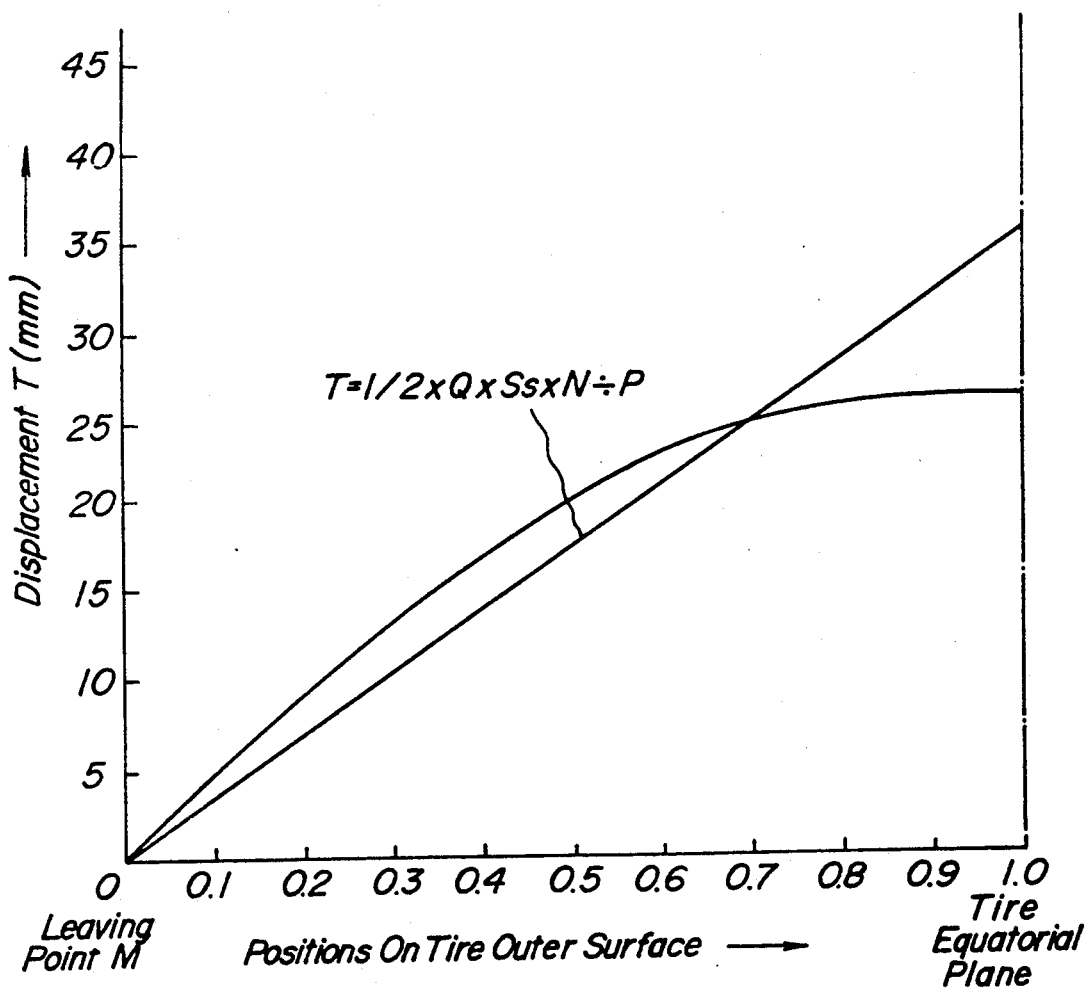
FIG. 6 is a graph illustrating results of displacements measured at respective points on outer surfaces of tires of Comparative Example 1 used in the experiment.
Figure 7:
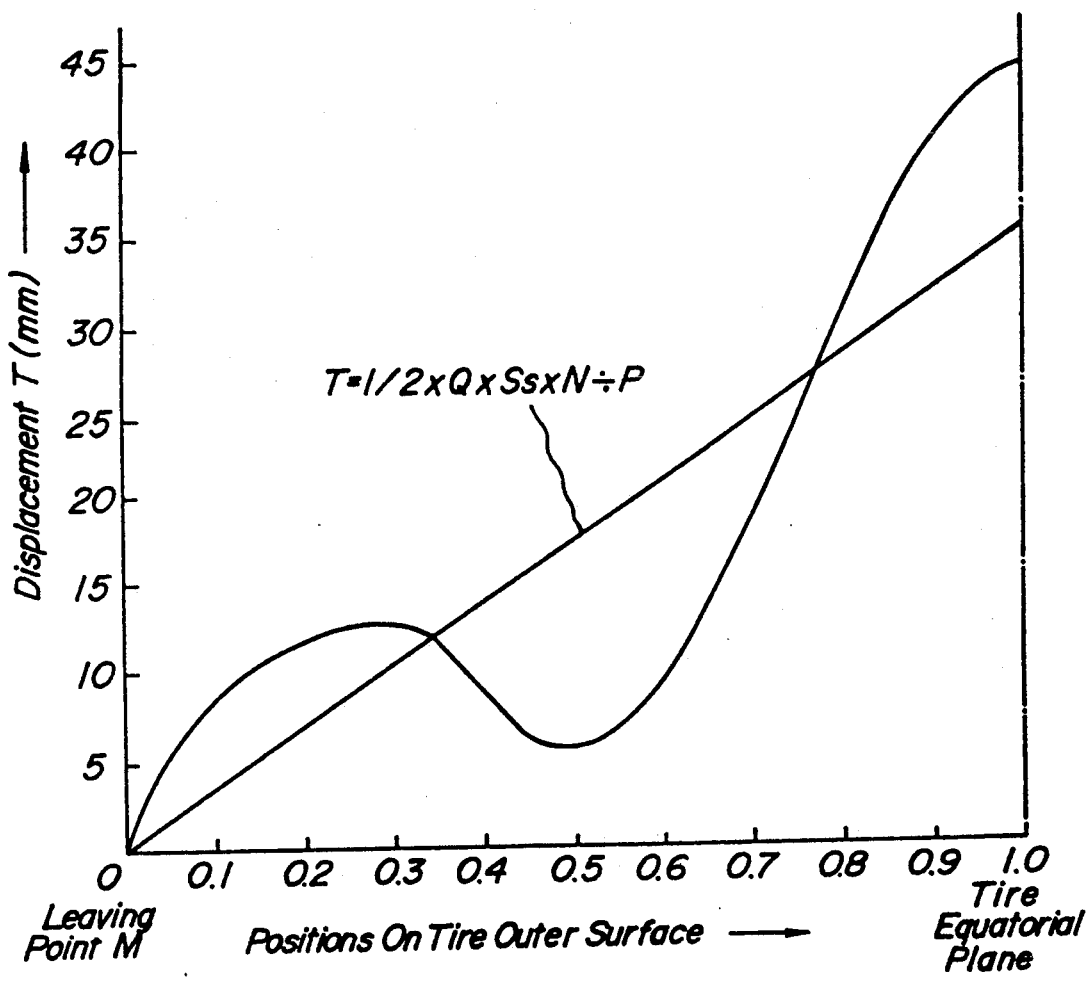
FIG. 7 is a graph illustrating results of displacements measured at respective points on outer surfaces of tires of Comparative Example 2 used in the experiment.
Figure 8:
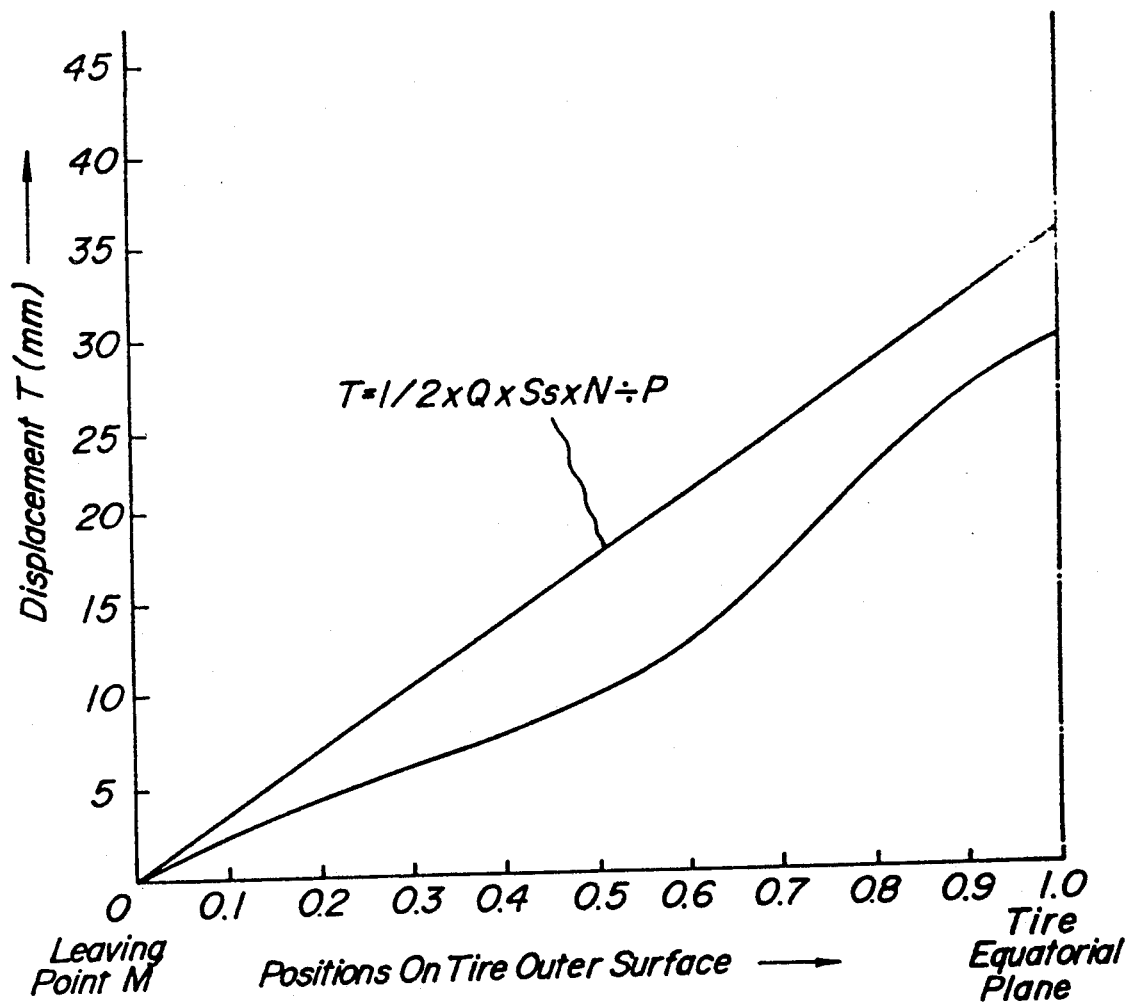
FIG. 8 is a graph illustrating results of displacements measured at respective points on outer surfaces of tires of Example 1 according to the invention used in the experiments.
Figure 9:
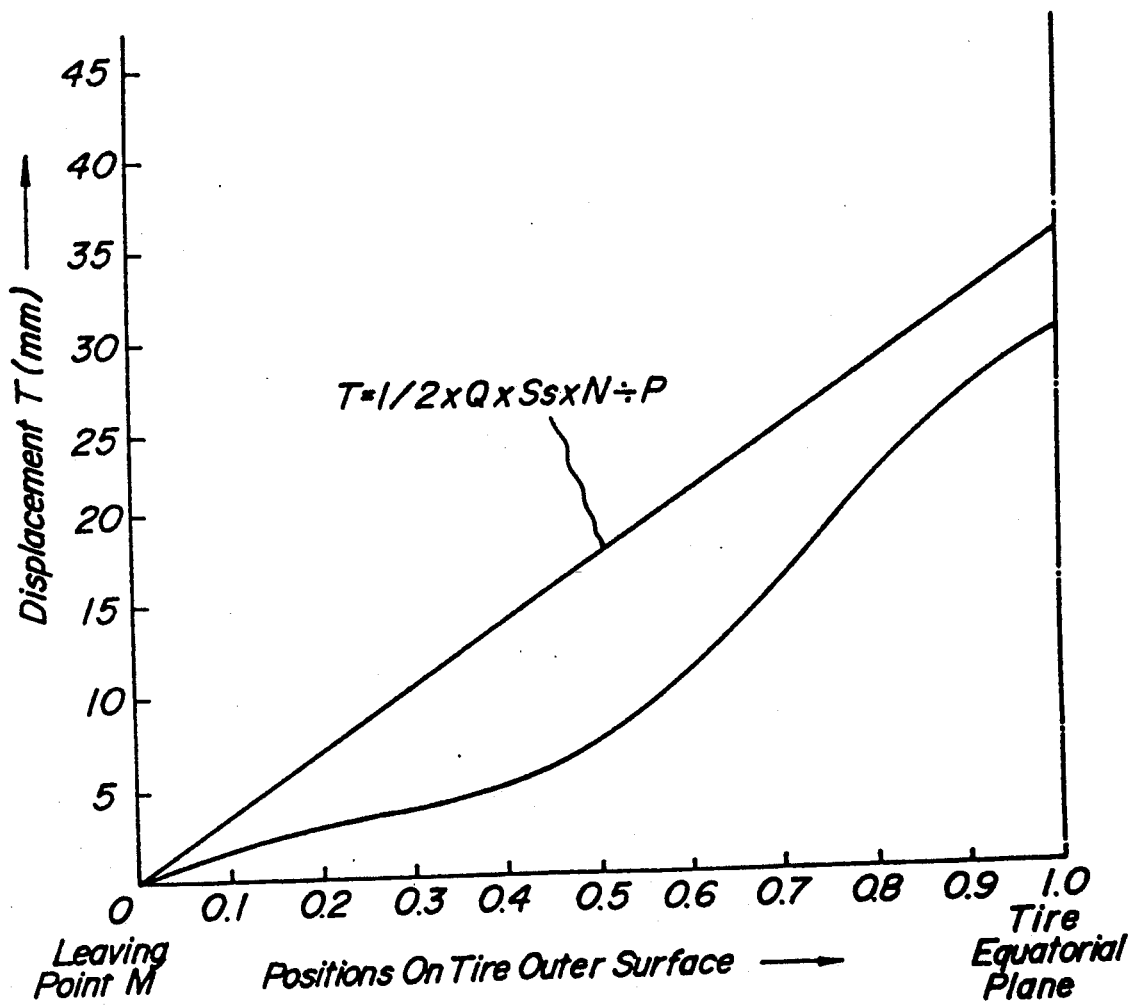
FIG. 9 is a graph illustrating results of displacements measured at respective points on outer surfaces of tires of Example 2 according to the invention used in the experiment.

During the above measurement, displacements T of respective points on outer surfaces of the tires were simultaneously measured whose results are shown as to Comparative Example 1 in FIG. 6, Comparative Example 2 in FIG. 7, Example 1 in FIG. 8 and Example 2 in FIG. 9. The tires of Examples 1 and 2, all the displacements T are less than values obtained by the equation $T = \frac{1}{2} \times Q \times S \times N \div P$ and progressively increase as approaching from leaving point to the tire equatorial plane. On the other hand, with the Comparative Example 1 the displacements T at bead portions and sidewalls are more than that obtained by the above equation but from the shoulder ends to crown portions are substantially equal to that obtained by the above equation. Therefore, the displacements within the range do not progressively increase.

Moreover, with Comparative Example 2, displacements T in the proximities of the bead portions and crown portions are more than that obtained by the equation and in the proximities of the shoulders are minimum, so that the displacements do not progressively increase as in those of Examples.

High speed durability test bead durability test, double load durability test and anti-cutting property test were carried out on the above tires. The high speed durability test was effected by repeating drum tests fifty times under take-off conditions loaded by the normal load. In the bead durability test, the above tires were repeatedly caused to run on a road for a predetermined of time under a constant load or a heavier load than the normal load and repeated numbers until occurrence of failure were measured. The results were indicated by indexes. The larger the index values, the better are the results.

In the double load durability test, running on a road and taking-off running under twice the normal load were repeated two times on the tires. In the anticutting property test, each of the tires was urged against a road surface with protrusions interposed between the tire and the road surface under the normal load and areas of the crown portions enclosing the protrusions were measured. The results were indicated by indexes. The larger the index values, the better are the results.

These results are shown in Table 2. As can be seen from the results in Table 2, the tires of Examples 1 and 2 according to the invention are remarkably improved in bead durability and double load durability in comparison with the tires of Comparative Examples 1 and 2. Moreover, as to the high speed durability, the tires of Examples 1 and 2 according to the invention are improved to be superior to the tires of Comparative Example 1 and substantially at the same level as the tires of Comparative Example 2. As to the anti-cutting property, the tires of Examples 1 and 2 are improved to be higher than tires of Comparative Example 2 and substantially at the same level as the tires of Comparative Example 1.

It is further understood those skilled in the art that the foregoing description is that of preferred embodiments of the disclosed tires and that various changes and modifications may be made in the invention without departing from the spirit and scope thereof.

TABLE 1

|  | Comparative Example 1 | Comparative Example 2 | Example 1 | Example 2 |
| --- | --- | --- | --- | --- |
| Outer diameter filled with 1% of normal inner pressure (mm) | 1168.5 | 1145.3 | 1164.3 | 1165.6 |
| Outer diameter filled with normal inner pressure (mm) | 1218.7 | 1231.2 | 1222.8 | 1225.0 |
| Enlargement ratio of outer diameter (%) | 5.0 | 7.5 | 5.2 | 5.1 |

TABLE 2

|  | Comparative Example 1 | Comparative Example 2 | Example 1 | Example 2 |
| --- | --- | --- | --- | --- |
| High speed durability test | Tread separation occurred at 42 times of taking-off tests | Complete run without failure | Complete run without failure | Complete run without failure |
| Bead durability test | 100 | 95 | 150 | 170 |
| Double load durability test | Burst occurred due to ply cord cut in bead portion | Burst occurred due to ply cord cut in bead portion | Complete run without failure | Complete run without failure |
| Anti-cutting property test | 100 | 90 | 100 | 100 |

What is claimed is:

1. A bias aircraft having a laminate formed by laminating a plurality of plies intersecting with each other and reinforced by organic fiber cords having a large thermal contraction coefficient, both ends of the plies being turned up around bead cores, wherein a profile curve I of a representative by corresponding to that ply counted from an innermost ply of the laminate which is one half of a total number of the plies plus one when the tire is mounted on a normal rim and is filled with 1% of a normal inner pressure comprises a smoothly changing crown profile curve J and a smoothly changing side profile curves K, said crown profile curve J intersecting a natural equilibrium profile curve H at shoulder ends and being positioned between natural equilibrium profile curves E and H between both the shoulder ends, and said side profile curves K contacting both the natural equilibrium profile curves E and H at predetermined rim points of intersection and smoothly connecting with the crown profile curve J and being positioned outwardly of the natural equilibrium profile curves E and H between said shoulder ends and the predetermined rim points of intersection, where said natural equilibrium profile curve E is determined by a diameter D (mm) of said representative ply, a cord angle A (degree) of said representative ply at an equatorial plane of the tire, a diameter B (mm) of said representative ply at the predetermined rim point and a width C (mm) of said representative ply at the predetermined rim point when filled with 1% of the normal inner pressure, and said natural equilibrium profile curve H is determined by the cord angle A, the diameter B and the width C and a diameter G (mm) having a relation of $D+3(D-B)/100 < G < D+10(D-B)/100$.

2. A bias aircraft tire as set forth in claim 1, wherein in filling the tire mounted on the normal rim with inner pressure from 1% to 100% of a normal inner pressure, an enlargement ratio S (%) of an outer diameter of the tire on the equatorial plane is less than a value obtained by an equation of $S = 17.73 - 13.85 \times R$, and a displacement T (mm) at any point L on a tire outer surface in its meridian section is less than a value obtained by an equation of $T = \frac{1}{2} \times Q \times S \times N \div P$ and progressively increases as approaching from a leaving point M where the outer surface of a tire leaves from the rim flange, to the equatorial plane of the tire, where N (mm) is a surface distance on the tire outer surface from the leaving point M to the point L when the tire is filled with 1% of the normal inner pressure, P (mm) is a surface distance on the tire outer surface from the leaving point M to an intersecting line between the tire outer surface and the equatorial plane of the tire, Q (mm) is an outer diameter of the tire when filled with 1% of the normal inner pressure, and R is an Aspect ratio of the tire when filled with the normal inner pressure.

3. A bias aircraft tire as set forth in claim 1, wherein a profile of the outer surface of the tire at a portion of a tire contacting the rim flange is substantially coincident with a profile of an inner surface of the rim flange when the tire is filled with the normal inner pressure.

4. A bias aircraft as set forth in claim 1, wherein the total number of the plies is more than twelve, and said bead cores on one side consist of three sets of bead cores and the representative ply is turned up around a middle set of bead cores.

5. A bias aircraft tire as set forth in claim 1, wherein a distance between bead heels in vulcanizing is within 85%–97% of a distance between bead heels when the tire is filled with 1% of the normal inner pressure.

* * * * *